United States Patent [19]
Higgins

[11] 3,972,965
[45] Aug. 3, 1976

[54] SPECIAL AERATOR
[75] Inventor: Robert Brown Higgins, Lenexa, Kans.
[73] Assignee: Ecodyne Corporation, Lincolnshire, Ill.
[22] Filed: Mar. 10, 1975
[21] Appl. No.: 556,592

[52] U.S. Cl. .................. 261/91; 210/219
[51] Int. Cl.² .......................... B01F 3/04
[58] Field of Search ........... 210/68, 150, 194, 195, 210/196, 197, 169, 205, 208, 214, 219, 532 S; 261/36 K, 91, 94, 98, 121 M

[56] References Cited
UNITED STATES PATENTS

| | | | |
|---|---|---|---|
| 2,051,727 | 8/1936 | Levine et al. | 210/150 X |
| 2,137,397 | 11/1938 | Haldeman | 261/121 M |
| 2,183,657 | 12/1939 | Page | 210/150 X |
| 3,167,600 | 1/1965 | Worman | 261/94 |
| 3,204,768 | 9/1965 | Daniel | 210/197 |
| 3,210,053 | 10/1965 | Boester | 210/208 |
| 3,360,460 | 12/1967 | Weston | 210/219 |
| 3,543,937 | 12/1970 | Choun | 210/150 |
| 3,576,316 | 4/1971 | Kaelin | 261/91 |
| 3,662,890 | 5/1972 | Grimshaw | 210/205 |
| 3,753,897 | 8/1973 | Lin et al. | 210/197 |

Primary Examiner—Theodore A. Granger
Attorney, Agent, or Firm—Joel E. Siegel; Charles M. Kaplan

[57] ABSTRACT

An improved aeration apparatus for use in sewage treatment plants to dissolve oxygen into the sewage. The aeration apparatus is specifically designed for use in combination with a single home sewage treatment unit. The aeration apparatus includes a motor assembly for rotation of a propeller through a downwardly extending drive shaft. The propeller extends downwardly into a draft tube so as to pump the liquid to be aerated upward therethrough. A deflector plate directs the rising liquid radially outward in all directions. A slinger is positioned about the drive shaft immediately below the deflector plate. The motor is designed to pull only fresh air into the aerator housing. To avoid clogging the propeller is free to move in one direction or another when a large object comes through the draft tube.

5 Claims, 2 Drawing Figures

SPECIAL AERATOR

BACKGROUND AND SUMMARY OF THE INVENTION

The present invention relates to an improved aeration apparatus for use in sewage treatment plants to dissolve oxygen into the sewage, and more particularly to an improved aeration apparatus for use in combination with a single home sewage treatment unit.

At the present time, most single-family homes and small multiple-family homes that are not connected to a central sewer system employ a septic tank system for the disposal of biodegradable wastes, particularly sewage. These tanks are generally of very low efficiency in processing these wastes, and, as a result, often tend to pollute the environment. Because of the well known pollution problems that are generated by septic tank systems, regulatory authorities in many areas have banned the use of such tanks, and it is expected that such bans will become more prevalent in the future. Accordingly, there is a need for a high-efficiency unit for the treatment of biodegradable wastes which is compact, inexpensive, and can be used to provide such treatment for single-family dwellings and small multiple-family dwellings.

Generally, such units provide a means for treating a liquor containing biodegradable wastes which comprises delivering the liquor to a quiescent settling zone, in which large particulates are permitted to settle to the bottom where they are subjected to digestion by anaerobic microorganisms. The liquor is delivered from the settling zone to an aeration zone, where it is aerated, and is then delivered downwardly through a column of submerged fixed media. The fixed media is composed of a multiplicity of elements which are freely and randomly stacked on one another to provide interstitial area between them. These elements have a high surface area to volume ratio, so that aerobic microorganisms can grow on their surface to treat biodegradable wastes contained in the liquor. As a result of their random stacking and high surface area, the elements promote homogeneous contact of the liquor with the fixed media. The liquor is received at the bottom of the fixed media and recirculated through the aeration zone and back through the fixed media in order to provide multiple passes through the media for thorough treatment. After such treatment, the effluent that has passed through the fixed media is withdrawn from the unit.

The present invention is directed to an improved direct drive mechanical aeration apparatus for supplying the aerobic microorganisms with the oxygen required for them to multiply rapidly and supply the aerobic bacteria required for the aerobic metabolism of the sewage organics. If sufficient oxygen is not supplied, the bacteria operate on an anaerobic metabolic pathway and produce poor treatment and obnoxious odors.

The use of direct drive mechanical aerators have been used in the sewage treatment field for many years. These aerators have generally been mounted upon floats; an example of such is disclosed in U.S. Pat. No. 3,572,658. Another type of heretofore used mechanical aerator which is not float mounted and utilizes a draft tube to draw liquid up into the propeller is disclosed in U.S. Pat. Nos. 2,186,371 and 2,346,366. The present invention is an improvement upon the latter type of mechanical aerators and is specifically designed for use in a single home sewage treatment unit.

It is a primary object of the present invention to provide an improved direct drive mechanical aerator for use in sewage treatment plants to dissolve oxygen into the sewage which is highly efficient and therefore consumes less horsepower to supply the same quantity of oxygen.

Another object is to provide a direct drive mechanical aerator specifically designed for use in combination with a single home sewage treatment unit which makes use of the aerator motor fan to force air into the unit so that a fresh supply of oxygen is present at all times.

A further object of the present invention is to provide a mechanical aerator which prevents clogging at the propeller.

An even further object is to provide a mechanical aerator which protects the motor bearings from the inherent water spray.

These and other objects are realized in accordance with the present invention by providing an aerator which includes a motor assembly extending through the sewage unit cover, having a downwardly extending shaft, which in turn is secured to and rotates a propeller. The propeller extends downward into a draft tube so as to pump the liquid to be aerated upward therethrough such that it is thrown against a deflector plate and sprayed out radially in all directions. The thin film of liquid leaving the edge of the deflector plate results in a high transfer efficiency of oxygen from the air located in the space between the sewage unit cover and the liquid surface. A slinger is positioned about the motor shaft below the deflector plate. The slinger being of slightly larger diameter than the shaft opening in the deflector plate acts as a pump to prevent liquid from passing up through the area between the motor shaft and the deflector plate. Additionally, any liquid which might pass up through that area is allowed to pass back through an open area provided between the deflector plate and the motor. In this manner the motor bearings are protected from the inherent liquid spray. Besides being the prime mover, the motor also maintains an air oxygen layer between the liquid surface and the sewage unit cover. The motor fan pulls fresh air into an aerator housing through an air vent in communication with the outside. The fresh air passes through the motor where it is heated and passes out of the aerator housing through openings therein into the area above liquid surface. A seal is provided between the motor and the aerator housing to insure that only fresh air is pulled through the motor by the motor fan. To avoid clogging there is provided enough clearance between the draft tube and the propeller. Additionally, the propeller is free to move in one direction or another if a large object comes through the draft tube.

DESCRIPTION OF THE DRAWINGS

Other objects and advantages will become apparent from the following description when read in connection with the accompanying drawing in which.

DESCRIPTION OF A PREFERRED EMBODIMENT

Figure 1:
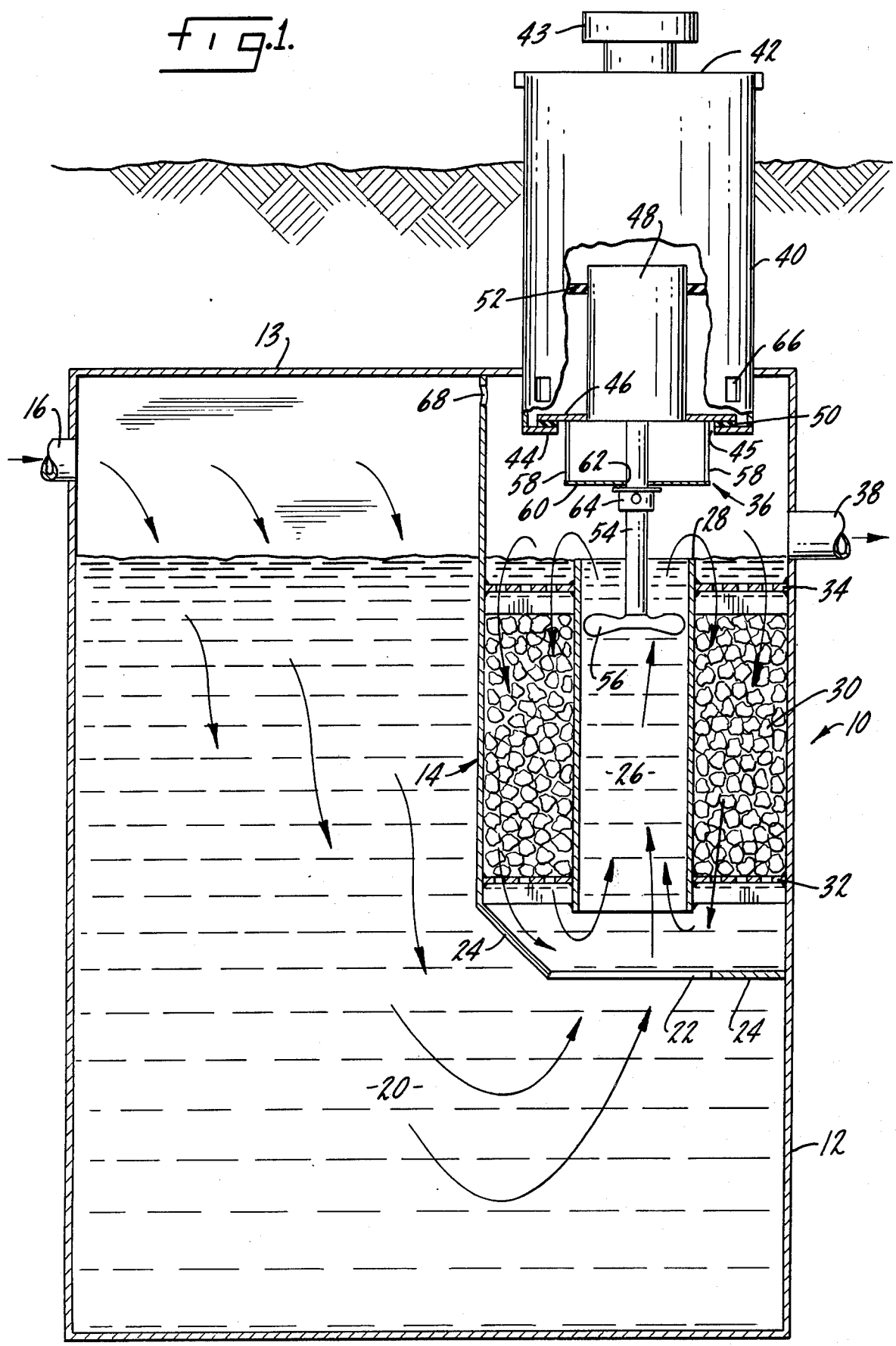
FIG. 1 is a cross-sectional view of an exemplary single family home sewage treatment unit incorporating aeration apparatus constructed in accordance with the present invention.

Referring to FIG. 1, an exemplary treatment apparatus of the type contemplated for use with the aeration apparatus of the present invention is generally indicated by reference numeral 10. Apparatus 10 is of the type disclosed in U.S. Pat. Application Ser. No. 447,293, filed Mar. 1, 1974. Apparatus 10 includes a tank 12 having a top cover 13, within which is disposed a reactor 14. Tank 12 has an inlet pipe 16 communicating with an upper portion thereof. The main portion of the tank 12 forms a settling and anaerobic digestion area 20. Reactor 14 has an opening 22 in the bottom thereof, formed by baffles 24. Liquid from the settling and anaerobic digestion area 20 passes into the reactor 14 through the opening 22. A section of pipe 28 defines a central flow passageway or draft tube 26 in reactor 14. Flow passageway 26 is surrounded by fixed media 30 which is contained between the walls of the reactor 14 and the central flow passageway 26. Fixed media 30 is confined between a perforated floor 32 and a perforated cover 34. Fixed media 30 may be any suitable material which is receptive to aerobic microbial growth.

In order to provide for aerobic digestion of bacteria, it is essential that an aeration zone be provided. An aeration apparatus embodying features of the present invention is provided for this purpose and is indicated generally at 36. Aeration apparatus 36 is provided to draw liquid upwardly through draft tube 26, and to aerate and distribute the liquid over the top of the fixed media 30.

In operation, a liquor containing biodegradable wastes is delivered to the tank 12 through the inlet pipe 16. The liquid passes into the settling and anaerobic digestion area 20, wherein, the floatable materials are degraded on the surface thereof after degradation and any remaining solids settle to the bottom of tank 12. The particulate matter which settles to the bottom of tank 12 is digested by the anaerobic bacteria which exists within the biodegradable material. The liquor passes from area 20 into the reactor 14 through the opening 22. The liquid is then drawn upward through draft tube 26 by aeration apparatus 36 and distributed over the top of the fixed media 30, in a manner which will be more fully described following the detailed disclosure of aeration apparatus 36. The liquor passes downwardly through the fixed media 30 where it is aerobically digested by the microorganisms on the surface thereof. Any solids that are released from the fixed media 30 pass downwardly into the settling and anaerobic digestion area 20, where they may be periodically collected. After the liquor has made a pass through the fixed media 30, it again passes upwardly through the draft tube 26, and is recirculated through the fixed media. This recirculation occurs a number of times before the liquor is withdrawn from the unit through an effluent pipe 38.

Figure 2:
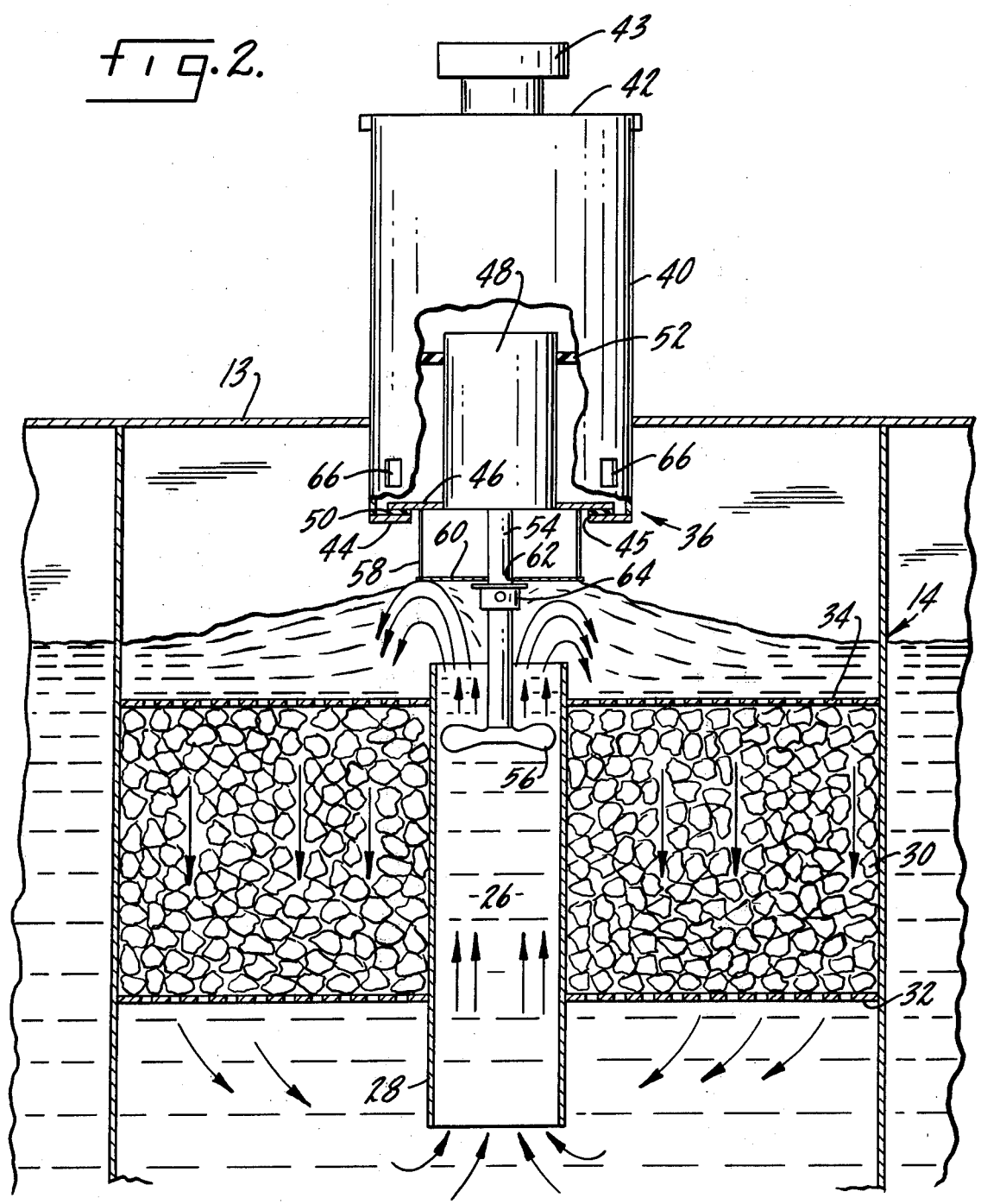
FIG. 2 is a cross-sectional view of the aeration section of the apparatus illustrated in FIG. 1.

Referring to FIG. 2, the aeration apparatus embodying features of the present invention is indicated generally at 36. Aerator 36 includes a housing tube 40 which extends through and is secured to tank cover 13. Housing 40 is open at its lower end and closed at its upper end by a cover member 42. An air inlet vent 43 is provided through cover 42 to permit the entry of fresh air into housing 40. An annular lip 44 defining an opening 45 is secured to and extends inward from the bottom edge of housing 40. Resting above lip 44 is a base plate 46 which in turn supports a motor assembly 48 thereabove within housing 40. A gasket seal 50 is sandwiched between lip 44 and base plate 46. A flexible rubber seal 52 is wedged between the motor assembly 48 and the housing 40 for stabilizing and dampening vibrations set up in the aerator assembly 36.

A shaft 54 extends downward from motor 48 through base plate 46 into draft tube 26. A propeller 56 is secured at the lower end of shaft 54 within draft tube 26. Propeller 56 is pitched to draw liquid upwardly through tube 26. Supported below and spaced from base plate 46 by radially spaced apart inter-connecting members 58 is a floating deflector plate 60 having an opening 62 therein for receipt of shaft 54 therethrough. A slinger member 64 is secured about shaft 54 immediately below deflector plate 60. Slinger 64 is slightly larger in diameter than opening 62 in deflector plate 60 and acts as a pump to prevent liquid from passing up through the opening 62. Any liquid which might pass up through the opening 62 is allowed to pass back into the tank 12 through the open area between the members 58. Slinger 64 thereby protects the motor bearings from the liquid spray in this manner.

Besides being the prime mover, the motor 48 also maintains an air oxygen layer between the liquid surface in reactor 14 and the cover 13. To this end slots 66 are provided through the side of housing 40 adjacent the lower end thereof. The motor fan pulls fresh air into the top of housing 40 above seal 52 through air vent 43. The fresh air then passes through motor 48 where it is heated and passed out into the housing 40 below seal 52 and then through the slots 66 into the area above the liquid surface in reactor 14. The seal 52 insures that only fresh air is pulled through the motor 48 by the motor fan.

In the operation of aerator 36, the propeller 56 and slinger 64 are rotated through shaft 54 by motor 48. As the propeller 56 rotates, it pumps liquid up through draft tube 26 as shown by the arrows in FIG. 2. The velocity of the liquid pumped through draft tube 26 is such that it is thrown upwardly against the deflector plate 60 and sprayed out radially in all directions. The liquid leaves the outside edges of deflector plate 60 in a thin film. This thin film results in a high transfer efficiency of oxygen from the air located in the area between cover 13 and the liquid surface in reactor 14. The velocity of the liquid leaving the edge of deflector plate 60 is such that considerable turbulence is created when that liquid contacts with the liquid surface causing considerable additional oxygen transfer to the liquid in that area. The liquid which is pumped from the draft tube 26 flows down through media 30 and then back up through the draft tube to repeat the cycle.

Aerator 36 utilizes a floating deflector plate 60 which maximizes the turbulence of the impact of the liquid and consequently increases aeration efficiency. As alluded to above, deflector plate 60 and members 58 cooperate with each other to permit any liquid which does penetrate the area between the slinger 64 and deflector plate 60 to run back into the treatment unit. Another feature of the aerator 36 is its unique manner of avoiding clogging of the propeller 56 with rags and other materials. To this end, the propeller 56 is designed to permit enough clearance between it and the draft tube 26 to avoid the possibility of the aerator being stalled by rags or other fibrous material. Further, the propeller 56 and shaft 54 is free to move in one direction or another if a large object comes through the draft tube 26. The entire motor assembly 48 merely sets inside the housing 40 on lip 44. The diameter of the motor base plate 46 is slightly smaller than the diameter of housing 40. During normal operation, the weight of the aerator 36 plus the force the liquid exerts on the propeller 56 holds the aerator in position. The seal 52 also helps hold the aerator 36 in position during normal operation. If a large solid object comes up through the draft tube 26, the object forces the propeller 56 and shaft 54 to one side, the motor 48 pivots around base plate 46 and the top of the motor 48 causes a deflection in rubber seal 52. As the object passes by, the aerator 36 returns to its normal operating position. Another feature of aerator assembly 36 is the utilization of the aerator motor to supply fresh oxygen to the open area below cover 13 in reactor 14, in the manner alluded to hereinabove. As described previously, the outside air is pulled through the motor 48 where it is heated and consequently forced out through openings 66 in housing 40. This ventilation system also forces any obnoxious odors that might develop out through openings 68 in reactor 14 and then through inlet pipe 16, where they are dispersed preventing objectionable odors on ground level around the treatment unit.

Obviously, many modifications and variations of the present invention as hereinabove set forth will occur to those skilled in the art, and it is intended to cover in the appended claims all such modifications and variations as fall within the true spirit and scope of the invention.

What is claimed is:

1. In combination with an enclosed tank containing liquid to be aerated, an improved mechanical aerator; comprising:
    a. draft tube means extending down into the liquid within said tank;
    b. shaft means extending downward into said draft tube means;
    c. propeller means mounted for rotation on said shaft means within the upper end of said draft tube means for pumping said liquor upward through said draft tube means and lifting said liquid above the surface of the liquid within said tank;
    d. an enclosed chamber extending downward into said tank;
    e. air inlet means located in an upper portion of said chamber;
    f. air outlet means located in a lower portion of said chamber in communication with an upper portion of said tank;
    g. motor assembly means mounted within said chamber for rotating said shaft means and for drawing air into said chamber through said air inlet means and through an upper portion of said motor assembly means and out through a lower portion of said motor assembly means to be directed through said air outlet means into said tank; and
    h. seal means extending between said motor assembly means and said chamber between said upper and lower portions of said motor assembly means for precluding air from below said seal means to be drawn into said motor assembly means.

2. The invention as defined in claim 1 further including slinger means secured to said shaft means above the upper end of said draft tube means and floating deflector plate means extending downward from said motor assembly means positioned around said shaft means immediately above said slinger means for directing the liquid thrown thereagainst radially outward in a thin film.

3. The invention as defined in claim 2 wherein said deflector plate means is spaced from said motor assembly means by connecting members defining open areas therebetween to permit any liquid which is directed above said deflector plate to pass therethrough and back into said tank.

4. The invention as defined in claim 3 wherein said motor assembly means is secured to a base plate means which rests on top of a lip associated with and extending into said chamber such that said motor assembly means and said shaft means are free to pivot about said base plate means when said propeller means contacts a large object which has entered said draft tube means.

5. The invention as defined in claim 4 wherein said connecting members extend downward from said base plate means.

* * * * *